United States Patent Office 2,914,509
Patented Nov. 24, 1959

2,914,509
WATER-SOLUBLE POLYETHYLENE GLYCOL POLYESTERS CURABLE TO INSOLUBLE POLYMERS

Howard C. Woodruff, Latham, N.Y., assignor to General Electric Company, a corporation of New York No Drawing. Application December 28, 1953
Serial No. 400,755

12 Claims. (Cl. 260—75)

This invention relates to new compositions and their preparation and more particularly to new storage-stable water-soluble polyesters which can be converted to new water-insoluble polymers which are free of surface tack.

Bradley 2,166,542 teaches that polyesters made with polyglycols, for example polyethylene glycol maleate, are water-soluble, and that these polyesters can be converted to a gel by means of heat, or alternatively by the mechanism of free radical catalysis, or by means of oxygen. Polyesters of this type, for example the polyethylene glycol maleates, form a substantially water-insoluble coriaceous mass upon curing, whereas polyesters derived from monomeric glycols cure with a tacky surface. The polyethylene glycol maleates, for example, cure in a mass which is free of surface tack. The advantages of being water-soluble and of being free of surface tack upon curing are of considerable advantage in applications where it is necessary for the polyester to cure in a thin film in the presence of air. However, a polyester such as the polyethylene glycol 400 maleate possesses, additionally, a very serious disadvantage which limits, and in many cases presents a situation in which its use is impossible. This undesirable property, or major disadvantage, is that of "continuing conversion" which refers to the tendency of polyethylene glycol maleates, for example, to continue to react to "cure" of themselves on storage, and after a few days to change from medium viscosity liquids to gels. The tendency to convert or "cure-up" even under normal conditions of storage is not subject to any method of control heretofore known to the art without resorting to control agents or inhibitors which render the product unsuitable for subsequent use. For example, when hydroquinone is used as a stabilizing agent, the surface cure characteristics of the polyester is so altered that "tacky" cure products are formed. Various other "stabilizing" agents such as butyl catechol were also found to have the same effect, namely, that instead of the cured polyester having a surface which under ordinary conditions of air cure was non-tacky, the surface was rendered tacky by addition of one of these agents.

The combined characteristics of these soluble polyesters, namely, curing to a non-tacky surface, combined with storage instability, were observed in a series of polyethylene glycol maleates and fumarates. These tests showed that both maleic and fumaric acid derivatives of polyglycols containing from 5 to 11 ether linkages form non-tacky masses when cured, but that the polyesters themselves were unstable on storage. The following table summarizes a series of tests in which the molecular weight of the glycol is expressed numerically:

The polyethylene glycols comprise a series of homologous polyols which gradually increase in molecular weight according to the number of —$CH_2$—$CH_2$—O— units contained in the molecule. They are generally and conveniently designated by placing in Arabic numbers their approximate molecular weight after the name polyethylene glycol. For instance, polyethylene glycol 300 corresponds to $HO(C_2H_5O)_6H$ and polyethylene glycol 600 corresponds to $HO(C_2H_5O)_{12}H$.

Other methods of reducing the tendency of esters of the type under consideration to "gel" or "cure" have resulted in resorting to a substitution of certain component ingredients. For example, it has been found that it is possible to replace a part of the maleic anhydride content of, for example, polyethylene glycol 600 maleate with a saturated dibasic acid such as adipic acid or one which does not have readily polymerizable double bonds available for cross-linking, such as phthalic acid. This type product, while exhibiting a reduced tendency to "gel" or "cure" on storage, does however retain a tacky surface after conversion to an infusible mass and the final product is similar to that obtained as mentioned previously by the addition of inhibitors or stabilizing agents.

It has now been found that water-soluble polyesters can be prepared which can be caused to cure to a water-insoluble mass free of surface tack, said polyesters being stable on storage before curing is desired in the presence of air and various oxygen donor materials. In accordance with this invention, it has been found that polyethylene glycol maleates and fumarates can be prepared but in which a portion of the reactive unsaturation is removed from the actual chain forming structure of the polyester, by reacting, in addition to the ethylene dicarboxylic acid such as maleic or fumaric, an unsaturated dicarboxylic acid in which the unsaturation is removed from the direct chain of atoms connecting the carbons of the carboxyl group.

The resulting polyesters are stable during storage in the presence of oxygen and on curing become tough and coriaceous, and retain their ability to form tack-free or "dry" surfaces. For example, it has been found unexpectedly that polyesters derived from the esterification of polyethylene glycols and a combination of maleic anhydride and itaconic acid are stable on storage in the presence of air, and when cured in the presence of a peroxide catalyst at 150° C., rapidly form tough, tack-free masses. Additionally, it has been found that the same desirable characteristics are also exhibited by polyesters derived from polyethylene glycols esterified with a mixture of maleic anhydride and carbic anhydride, carbic anhydride designating the C-9 acid anhydride produced by condensing maleic anhydride and cyclopentadiene.

The products obtained in accordance with the process of this invention are water-soluble and cure in the presence of peroxide catalysts or free radical catalysts or heat, to cured products which are substantially water-insoluble. The uncured products on storage in the presence of air maintain an unchanged structure. Specifically, they remain essentially unchanged in viscosity and

| Alcohol | No. of Ethylene Glycol Units in Polyglycol | Acid | Water-Solubility | Type of Surface Cure | Storage Stability in Presence of Air |
|---|---|---|---|---|---|
| Polyethylene Glycol 300 | 5 | Maleic | Soluble | Non-tacky | Unstable. |
| Do | 5 | Fumaric | do | do | Do. |
| Polyethylene Glycol 600 | 5 | Maleic | do | do | Do. |
| Do | 5 | Fumaric | do | do | Do. |
| Polyethylene Glycol 400 | 7 | Maleic | do | do | Do. |
| Do | 7 | Fumaric | do | do | Do. | do not form a skin on the surface. After three months' storage, for example, they are unchanged in appearance and physical characteristics, the products are still soluble in water, and upon curing form non-tacky homogeneous products comparable in every way to similar cured derivatives produced from the freshly prepared polyester.

In order that those skilled in the art may better understand how the present invention may be practiced, the following examples are given by way of illustration and not by way of limitation. All parts are by weight.

*Example 1*

In a flask equipped with an agitator and a Dean-Stark type reflux, were mixed 600 parts of polyethylene glycol 600, 80 parts of fumaric acid, 46.8 parts of carbic anhydride and 80 parts of xylol. Under reflux, xylol was returned to the flask and entrained water was separated at a refluxing temperature of about 160–170° C. When all the water was separated, a stream of inert gas was passed through the mass and the condenser removed. The reaction system was thus freed of xylol, and consisted of an odorless polyester which was allowed to cool and was stored. This polyester had the following characteristics:

Color _____ 6–7.
Viscosity _____ $Z_2$.
Acid value _____ 24.
Cure time (200° C.) 3 seconds.
Water solubility __ Complete.
Storage stability ___ No change after 3 months.
Cure _____ (1% tertiary butyl per phthalate added to resin before curing (10 grams resin cured at 150° C.)—very tough tack-free cure.

*Example 2*

In a manner similar to that described in Example 1, itaconic acid and fumaric acid resin were prepared by mixing 900 parts of polyethylene glycol 600, 120 parts of fumaric acid, 58.5 parts of itaconic acid and 30 parts of xylol. After the reaction was carried out in a manner like that of Example 1, the characteristics of the polyester produced were:

Viscosity _____ Z–4.
Acid value _____ 20.4.
Color _____ 9.
Cure (200° C.)_ 2 seconds.
Mass cure _____ (1% tertiary butyl per phthalate added to resin before curing) (10 grams resin cured at 150° C.) very tough tack-free cure.
Storage stability_ No change after 3 months.
Water-solubility__ Complete.

The differences in structure between the storage stable products produced as above in Examples 1 and 2 from other polyethylene glycol unsaturated polyesters are shown in the following formulae in which A represents a structure wherein all active unsaturation is an integral link in the chain structure of the polyester. Structures B and C illustrate polyesters wherein only a part of the active unsaturation functions as links in the polyester chain structure. The remaining double bonds designated as "N" do not form part of the chain structure. (Ⓝ points to unsaturated bonds not in the direct chain structure of the polyester)

(A)

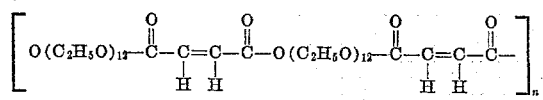

polyethylene glycol 600 maleate—showing how all unsaturate reactive groups are in the polyester chain structure.

(B)

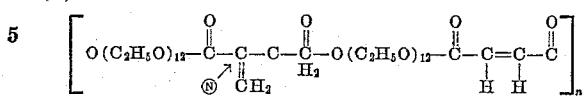

polyethylene glycol 600 itaconate-maleate showing how a portion of the active unsaturation is removed from the chain structure of the polyester.

(C)

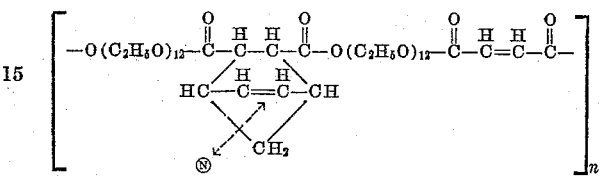

polyethylene glycol 600 carbate-maleate showing how a portion of the active unsaturation is removed from the chain structure.

In the above formulae, A is representative of a structure that:

(1) is water-soluble
(2) cures in the presence of
  (a) peroxide catalysts
  (b) free radical catalysts
  (c) heat
(3) the cured products are substantially water-insoluble
(4) on storage in the presence of air rapidly increases in viscosity, forms a gel structure and skins over the surface
(5) the gel structure is not soluble in water. However, on curing it forms a tacky non-homogeneous product and is not suitable for application in thin films.

Structures B and C are illustrative of compounds having the following highly desired properties:

(1) water-soluble
(2) cure in the presence of
  (a) peroxide catalysts
  (b) free radical catalysts
  (c) heat
(3) the cured products are substantially water-insoluble
(4) storage in the presence of air does not materially change the viscosity, nor does a skin form on the surface. After three months of storage, the polyesters are unchanged in appearance and physical characteristics
(5) after three months' storage, the product is still soluble in water, and on curing, it forms a non-tacky homogeneous product comparable in every way to similar cured derivatives produced from freshly prepared polyester.

It is apparent that one skilled in the art, from examination of the structural configurations exhibited by each of formulae A through C respectively, could not predict the excellent storage stability of B and C and their ability to yield non-tacky cured films. It has been found, however, that certain limits of ratio between polyester chain type double bonds and non-chain double bonds are necessary to produce these desirable characteristics. If all of the double bonds are non-chain type, the structure will not cure to a tough and tack-free mass. If insufficient non-chain double bonds are present, the structure will be sensitive to oxygen under storage conditions and be unstable. Accordingly, it has been found that the necessary ratio of non-chain double bonds to chain double bonds is between 5 and 40% and is preferably in the range of 25 to 35%. This means that the direct ester-to-ester unsaturation represents between 60 and 95% of the total unsaturation. These values may be obtained by employing an acid having unsaturation removed from the direct chain of the carboxyl-to-carboxyl linkage in the mol ratio of from 0.25 to 0.45 mol based on the acid having chain unsaturation. For example, these values may be obtained by employing from about 0.25 to .45 mol of an acid, such as itaconic or carbic acids, per mol of an acid such as maleic or fumaric or maleic anhydride. When employing the foregoing ratios of acid, the proportion of polyhydric alcohol which may be used lies in the range of 1 mol of alcohol to .7 to 1.4 mols of combined acids.

Further unobviousness of the properties of the polyesters prepared in the manner of the present invention can be demonstrated by the observation that mixtures of polyethylene glycol 600 maleate with polyethylene glycol 600 carbate do not have the characteristics of polyethylene glycol 600-carbate-maleate polyester prepared by processing together in a unit synthesis or single step operation, polyethylene glycol 600, maleic acid (or fumaric acid) and carbic anhydride. It has been observed that the mixed products invariably retain a surface tackiness, the surface tackiness not being found in the cured products prepared by processing the ingredients together.

The process of this invention is not limited to itaconic acid or carbic anhydride but has broader application to related acids.

The novel products of this invention have a wide field of utility. They may be used in textile or in paper manufacture where it is desired to deposit or coat a material with a synthetic resin from a water solution which is capable of air curing to a non-tacky surface. They may be used as binders for glass wool fibres in the manufacture of insulating bats. Other applications include use as sizing materials, as binders for abrasive, in the manufacture of laminates, etc.

What I claim as new and desire to secure by Letters Patent of the United States is:

1. The method of producing a water-soluble unsaturated polyester in which unsaturation directly in the ester-to-ester chain structure represents between 60 and 95% of the total unsaturation, and unsaturation other than directly in the ester-to-ester chain structure represents between 5 and 40% of the total unsaturation, which comprises the one-step process of esterifying at an elevated temperature about one mol of a polyethylene glycol having a molecular weight between 300 and 600 with about 0.7 to 1.4 moles of (1) a member selected from the group consisting of ethylenically unsaturated dicarboxylic acids and their anhydrides, the unsaturation being present in the chain of carbon atoms connecting the carboxyl groups, and (2) a member selected from the group consisting of itaconic and carbic acids and their anhydrides, the mol ratio of the second group member being between about .25 to .45 mol per mol of the member selected from the first group.

2. The water-soluble polyesters produced in accordance with the process of claim 1.

3. The stable insoluble product obtained by heat-curing at a temperature of the order of 200° C. the product produced in accordance with the process of claim 1 in the presence of tertiary butyl perphthalate as catalyst.

4. The method of producing water-soluble polyesters in which the percentage of total unsaturation of non-chain double bonds is between 25 and 35% which comprises esterifying at an elevated temperature about one mol of a polyethylene glycol having a molecular weight of between 300 and 600 with about 0.7 to 1.4 moles of (1) a member selected from the group consisting of ethylenically unsaturated dicarboxylic acids and their anhydrides, the unsaturation being present in the chain of carbon atoms connecting the carboxyl group, and (2) a member selected from the group consisting of itaconic and carbic acids and their anhydrides, the mol ratio of the second group member being between .25 and .45 mol per mol of the member selected from the first group.

5. The water-soluble polyesters produced in accordance with the process of claim 4.

6. The stable insoluble product obtained by heat-curing at a temperature of the order of 200° C. the product produced in accordance with the process of claim 4 in the presence of tertiary butyl perphthalate as catalyst.

7. The method of producing water-soluble polyesters in which the percentage of total unsaturation of non-chain double bonds is between 25 and 35%, which comprises esterifying at an elevated temperature about one mol of a polyethylene glycol having an average molecular weight of 600 with about 0.7 to 1.4 moles of (1) maleic acid and (2) itaconic acid, the itaconic acid being employed in an amount corresponding to .25 to .45 mol per mol of maleic acid.

8. The water-soluble polyester produced in accordance with the process of claim 7.

9. The stable insoluble product obtained by heat-curing at a temperature of the order of 200° C. the product produced in accordance with the process of claim 7 in the presence of tertiary butyl perphthalate as catalyst.

10. The method of producing water-soluble polyesters in which the percentage of total unsaturation of non-chain double bonds is between 5 and 40% which comprises esterifying at an elevated temperature about one mol of a polyethylene glycol having an average molecular weight of 600 with about 0.7 to 1.4 moles of (1) fumaric acid and (2) carbic anhydride, the carbic anhydride being employed in an amount corresponding to .25 to .45 mol per mol of fumaric acid.

11. The water-soluble polyester produced in accordance with the process of claim 10.

12. The stable insoluble product obtained by heat-curing at a temperature of the order of 200° C. the product produced in accordance with the process of claim 10 in the presence of tertiary butyl perphthalate as catalyst.

References Cited in the file of this patent

UNITED STATES PATENTS

| | | |
|---|---|---|
| 2,166,542 | Bradley | July 18, 1939 |
| 2,308,494 | D'Alelio | Jan. 19, 1943 |
| 2,475,731 | Weith | July 12, 1949 |